United States Patent
Gyotoku et al.

(10) Patent No.: US 11,420,291 B2
(45) Date of Patent: Aug. 23, 2022

(54) PROJECTION FORMING METHOD AND MACHINE

(71) Applicant: KAWASAKI JUKOGYO KABUSHIKI KAISHA, Kobe (JP)

(72) Inventors: Yuya Gyotoku, Kakogawa (JP); Ryo Morihashi, Kobe (JP); Yuto Sakane, Kobe (JP); Hiroka Fujita, Nishinomiya (JP); Yuki Ono, Akashi (JP); Hayato Iwasaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 265 days.

(21) Appl. No.: 16/474,373

(22) PCT Filed: Dec. 21, 2017

(86) PCT No.: PCT/JP2017/045992
§ 371 (c)(1),
(2) Date: Jun. 27, 2019

(87) PCT Pub. No.: WO2018/123820
PCT Pub. Date: Jul. 5, 2018

(65) Prior Publication Data
US 2019/0344388 A1 Nov. 14, 2019

(30) Foreign Application Priority Data
Dec. 27, 2016 (JP) .............................. JP2016-252570

(51) Int. Cl.
*B23K 26/342* (2014.01)
*B33Y 10/00* (2015.01)
(Continued)

(52) U.S. Cl.
CPC ............ *B23K 26/342* (2015.10); *B23K 26/21* (2015.10); *B33Y 10/00* (2014.12); *B33Y 30/00* (2014.12); *B23K 2103/14* (2018.08)

(58) Field of Classification Search
CPC .................. B23K 26/342; B23K 26/21; B23K 2103/14; B33Y 10/00; B33Y 30/00
(Continued)

(56) References Cited

U.S. PATENT DOCUMENTS 4,903,888 A * 2/1990 Clark ..................... B23K 9/046
228/119
5,233,150 A * 8/1993 Schneebeli ............ B23K 9/046
219/76.14

(Continued)

FOREIGN PATENT DOCUMENTS

| JP | H04-336304 A | 11/1992 |
|---|---|---|
| JP | 2005-152918 A | 6/2005 |
| JP | 2016-2565 A | 1/2016 |

*Primary Examiner* — John J Norton
*Assistant Examiner* — Simpson A Chen
(74) *Attorney, Agent, or Firm* — Oliff PLC

(57) ABSTRACT

A projection forming method forming a projection on the surface of a work and includes: forming a first bank by LMD such that the first bank surrounds a projection forming region on the surface of the work; forming a first layer on the projection forming region by the LMD such that the first layer covers the first bank; laminating at least one first height raising layer on the first layer by the LMD; forming a second bank by the LMD along a peripheral edge of the at least one first height raising layer; forming an intermediate base layer on the at least one first height raising layer by the LMD such that the intermediate base layer covers the second bank; and laminating at least one second height raising layer on the intermediate base layer by the LMD.

9 Claims, 9 Drawing Sheets

(51) Int. Cl.
*B23K 26/21* (2014.01)
*B23K 103/14* (2006.01)
*B33Y 30/00* (2015.01)

(58) Field of Classification Search
USPC .................................................. 219/76.1
See application file for complete search history.

(56) References Cited

U.S. PATENT DOCUMENTS

| 6,144,008 | A | * | 11/2000 | Rabinovich | ......... | C04B 38/0006 |
|---|---|---|---|---|---|---|
| | | | | | | 219/121.64 |
| 10,413,999 | B2 | * | 9/2019 | Tsuji | ....................... | B22F 10/20 |
| 2005/0109818 | A1 | * | 5/2005 | Shimohata | ........... | B23K 26/342 |
| | | | | | | 228/119 |
| 2014/0124483 | A1 | * | 5/2014 | Henn | ................... | B23K 26/342 |
| | | | | | | 219/76.1 |
| 2017/0120385 | A1 | | 5/2017 | Tsuji et al. | | |
| 2019/0025798 | A1 | * | 1/2019 | Yamasaki | ................. | B22F 3/16 |

\* cited by examiner

PROJECTION FORMING METHOD AND MACHINE

TECHNICAL FIELD

The present invention relates to a projection forming method using laser metal deposition (hereinafter referred to as "LMD"). The present invention also relates to a machine incorporating, as a part thereof, a product obtained by the projection forming method.

BACKGROUND ART

Projections have been conventionally formed by using the LIVID. When the projection is formed by using the LIVID, a heat affected zone (HAZ) can be made smaller than when the projection is formed by welding, such as TIG welding. For example, as shown in FIGS. 13A to 13D, PTL 1 discloses a method of forming the projection.

Specifically, according to the projection forming method disclosed in PTL 1, first, as shown in FIG. 13A, a plurality of first beads 121 are formed on the surface of a work 110 by the LMD so as to be spaced apart from one another. Next, as shown in FIG. 13B, a plurality of second beads 122 are formed among the first beads 121 by the LMD. Thus, a first layer is formed. After that, as shown in FIGS. 13C and 13D, third beads 123 and forth beads 124 are formed in the same manner as the first beads 121 and the second beads 122, and thus, a height raising layer is formed.

CITATION LIST

Patent Literature

PTL 1: Japanese Laid-Open Patent Application Publication No. 2005-152918

SUMMARY OF INVENTION

Technical Problem

However, according to the projection forming method disclosed in PTL 1, in order to prevent flow-down of a fusion zone at an edge when forming the height raising layer, the third beads 123 located at both ends cannot be actually formed right above the first beads 121 unlike FIG. 13D. As shown in FIG. 14, the third beads 123 located at both ends need to be formed at positions slightly inward of the positions right above the first beads 121. The same is true when fifth beads 125 are formed on the third beads 123. As a result, the method can form only the projection having a substantially trapezoidal sectional shape or a substantially triangular sectional shape. Therefore, when subjecting the projection to machine work to obtain a columnar body or the like, the projection needs to be relatively large, and therefore, such projection is wasteful.

An object of the present invention is to provide a projection forming method capable of forming by using LMD a projection rising with a substantially constant width, and a machine incorporating, as a part thereof, a product obtained by the projection forming method.

Solution to Problem

To solve the above problems, a projection forming method of the present invention is a method of forming a projection on a surface of a work and includes: forming a first bank by LMD such that the first bank surrounds a projection forming region on the surface of the work; forming a first layer on the projection forming region by the LMD such that the first layer covers the first bank; laminating at least one first height raising layer on the first layer by the LMD; forming a second bank by the LMD along a peripheral edge of the at least one first height raising layer; forming an intermediate base layer on the at least one first height raising layer by the LMD such that the intermediate base layer covers the second bank; and laminating at least one second height raising layer on the intermediate base layer by the LMD.

According to the above configuration, the first height raising layer is laminated on the first layer which is formed so as to cover the first bank. Therefore, the flow-down of the fusion zone at the edge when forming the first height raising layer is suppressed by the first bank through the first layer. Therefore, the peripheral edge of the first height raising layer can be made to coincide with a peripheral edge of the first layer. Further, the second bank is formed along the peripheral edge of the first height raising layer, and the second height raising layer is laminated on the intermediate base layer which is formed so as to cover the second bank. Therefore, the flow-down of the fusion zone at the edge when forming the second height raising layer is suppressed by the second bank through the intermediate base layer. On this account, a peripheral edge of the second height raising layer can be made to coincide with a peripheral edge of the intermediate base layer. Thus, the projection rising with a substantially constant width can be formed.

Each of the first bank and the second bank may have an annular shape. According to this configuration, the projection having a columnar shape can be formed.

The work may have a tubular shape. The surface of the work may be an inner peripheral surface or outer peripheral surface of the work. The projection forming region may have a ring shape that is continuous in a circumferential direction. Each of the first bank and the second bank may include a pair of beads opposed to each other in an axial direction of the work. According to this configuration, the projection having a flange shape can be formed.

The surface of the work may have a conical shape. A height of a large-diameter bead that is one of the pair of beads of the first bank may be higher than a height of a small-diameter bead that is the other of the pair of beads of the first bank. According to this configuration, the projection can be satisfactorily formed on a conical surface.

When forming the first layer, at least two rows of beads may be formed at an inside of the first bank. According to this configuration, the projection with a relatively large width can be formed.

For example, a height of the first bank may be equal to or more than 20% of a height of the at least two rows of beads.

For example, a bead constituting the first layer and located right above a bead constituting the first bank may be formed so as to cover at least a top of the bead constituting the first bank.

For example, the work may be made of a titanium alloy.

After the projection is formed, the projection may be subjected to machine work such that the first bank and the second bank are eliminated. According to this configuration, a final convex portion obtained by subjecting the projection to the machine work can secure high strength.

A machine of the present invention incorporates, as a part thereof, a product obtained by the above projection forming method.

Advantageous Effects of Invention

According to the present invention, the projection rising with a substantially constant width can be formed by using the LIVID.

DESCRIPTION OF EMBODIMENTS

Embodiment 1

Figure 1A:
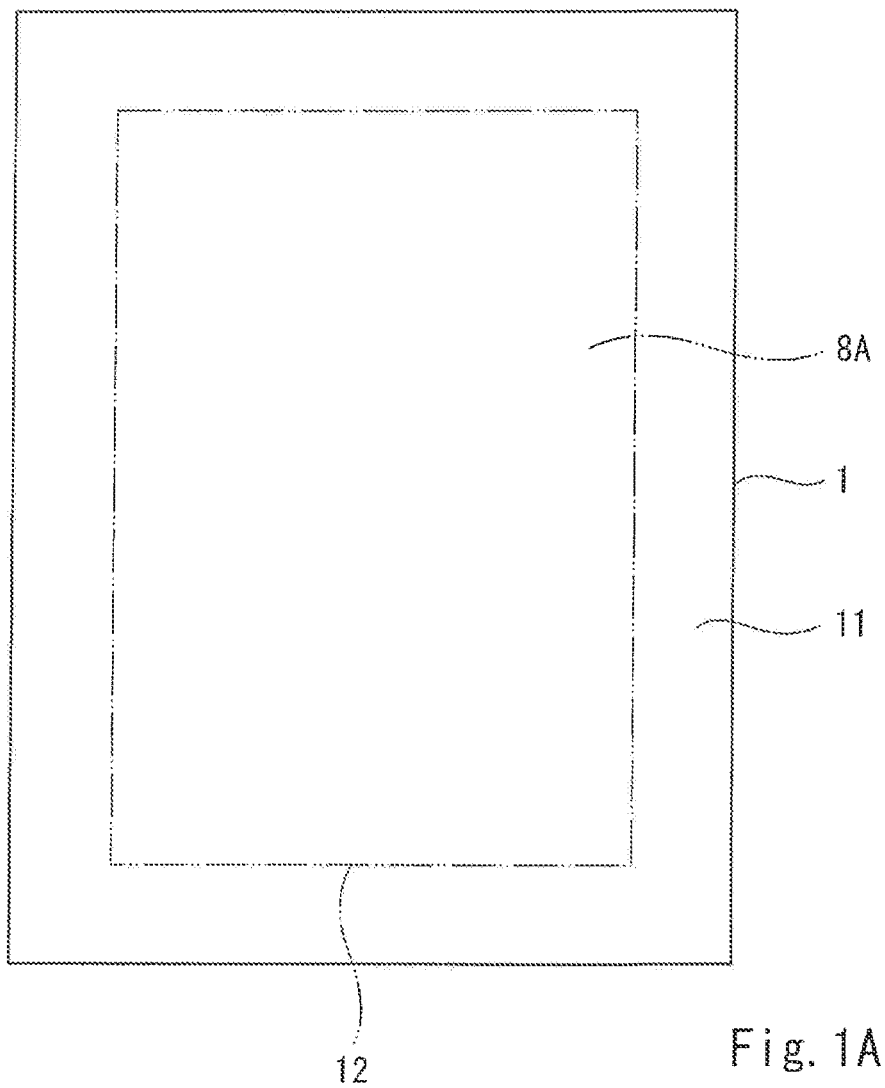
FIG. 1A is a plan view of a work used in a projection forming method according to Embodiment 1 of the present invention.
Figure 1B:
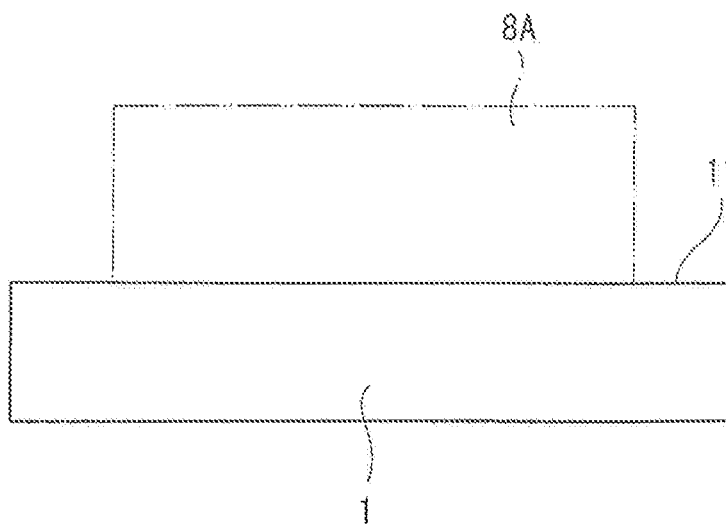
FIG. 1B is a side view of the work.

As shown in FIGS. 1A and 1B, a projection forming method according to Embodiment 1 of the present invention is a method of forming a columnar projection 8A on a surface 11 of a work (object to be processed) 1.

In the present embodiment, the projection 8A has a quadrangular shape in a plan view. In the illustrated example, the projection 8A has a rectangular shape in a plan view. However, the projection 8A may have a square shape in a plan view. Or, the projection 8A may have a shape other than the quadrangular shape, i.e., may have a shape such as a circular shape or an oval shape.

The projection forming method of the present embodiment includes a first bank forming step, a first layer forming step, a first height raising layer forming step, a second bank forming step, an intermediate base layer forming step, and a second height raising layer forming step. Through these forming steps, the projection 8A formed by the projection forming method of the present embodiment has a laminate structure including at least four layers. Hereinafter, details of these steps will be described.

(1) First Bank Forming Step

Figure 2A:
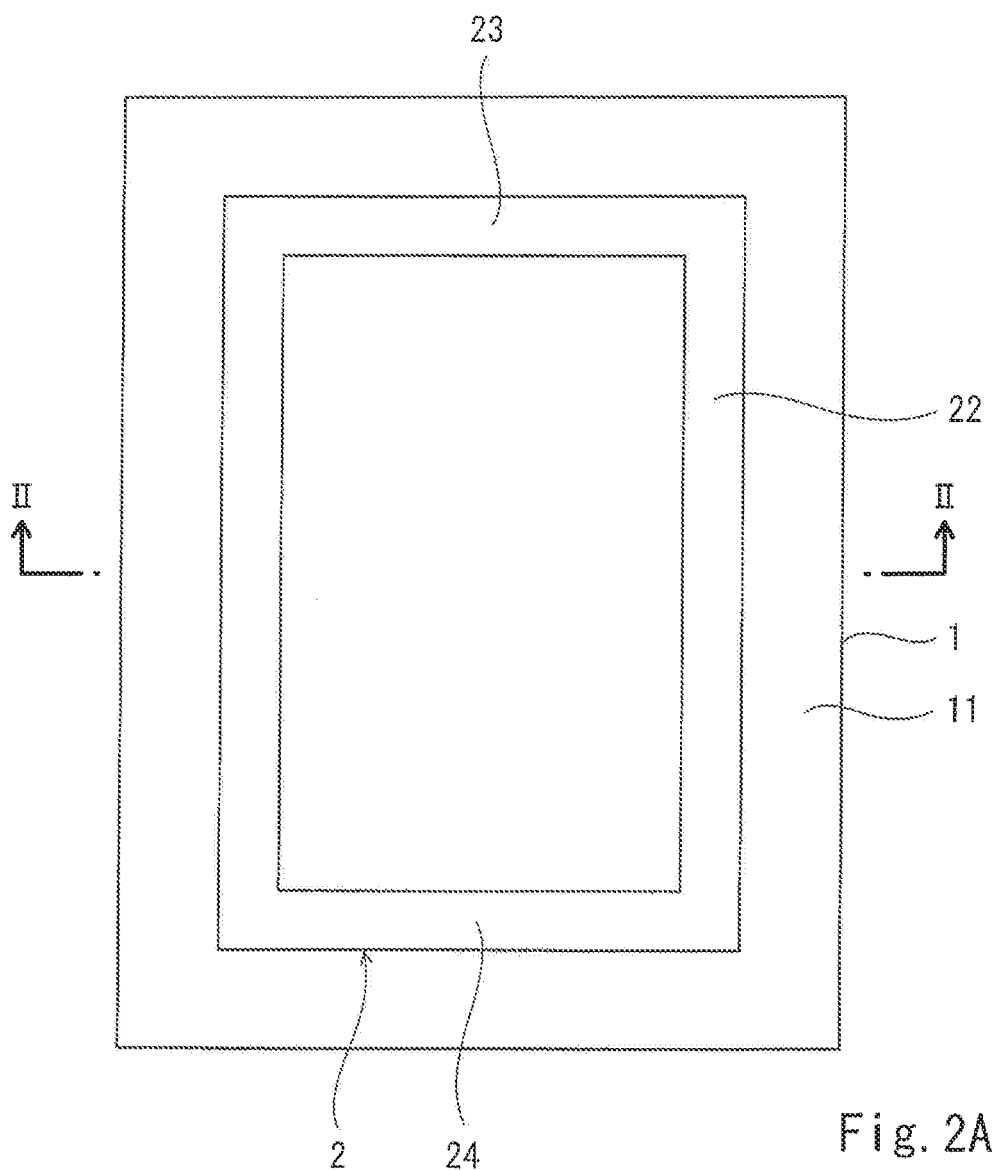
FIG. 2A is a plan view of the work at which a first bank is formed in Embodiment 1.
Figure 2B:
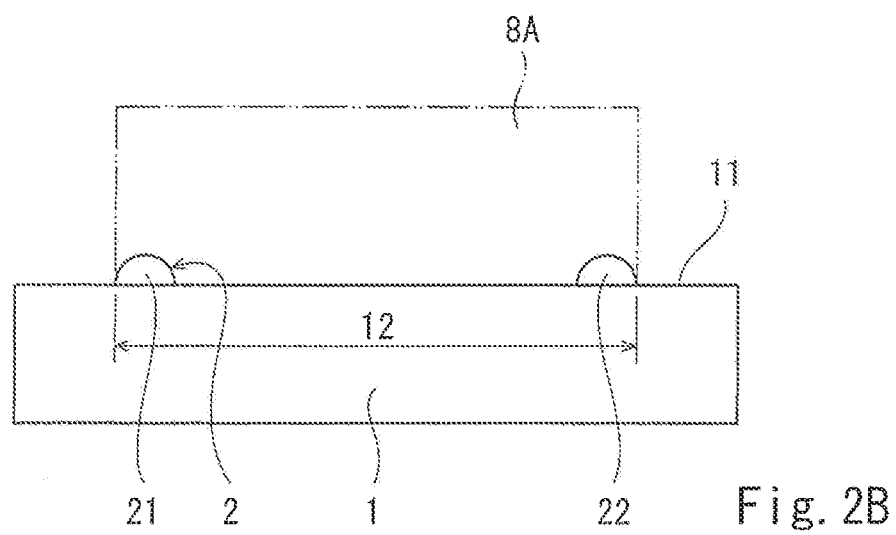
FIG. 2B is a sectional view of the work taken along line II-II of FIG. 2A.

In this step, as shown in FIGS. 2A and 2B, a first bank 2 is formed by the LMD so as to surround a projection forming region 12 (see FIG. 1A) on the surface 11 of the work 1. In the present embodiment, the first bank 2 is formed so as to trace a contour of the projection forming region 12 from an inside of the contour. However, the first bank 2 may be formed so as to trace the contour of the projection forming region 12 from an outside of the contour. Or, the first bank 2 may be formed so as to trace the contour of the projection forming region 12 while straddling the contour. For example, a center line of the first bank 2 may coincide with the contour of the projection forming region 12. Since the projection 8A is columnar and has a quadrangular shape in a plan view, the projection forming region 12 has a quadrangular shape, and the first bank 2 has an annular shape.

Figure 3:
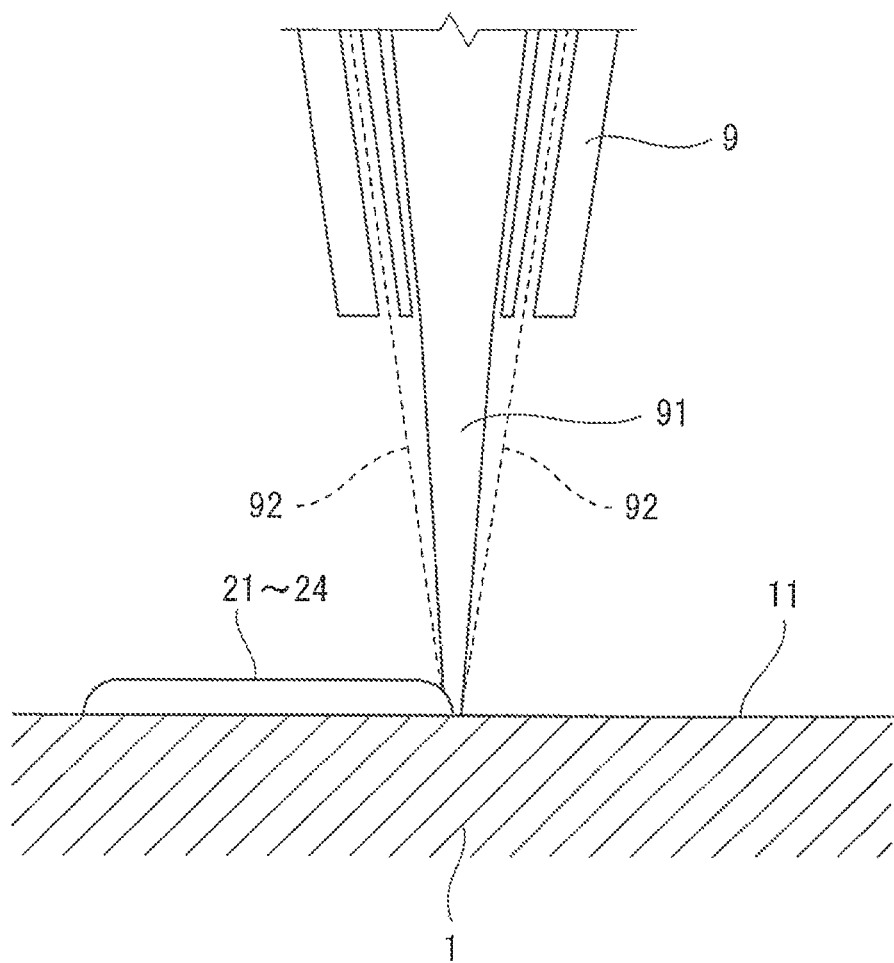
FIG. 3 is an enlarged sectional view of a nozzle of a LMD device.

In the present embodiment, a LMD device shown in FIG. 3 is used to perform the LMD (the same is true in the other steps). The LIVID device sprays metal powder 92 from a nozzle 9 onto the surface 11 of the work 1 while emitting a laser beam 91 from the nozzle 9 to fuse the surface 11. A direction of an optical axis of the laser beam 91 is a vertical direction. Thus, four beads (long-side beads 21 and 22 and short-side beads 23 and 24) constituting the first bank 2 are formed. Supply metal for the LIVID does not necessarily have to be the metal powder 92 and may be, for example, a wire.

A material constituting the work 1 is not especially limited. For example, the work 1 is made of a titanium alloy. The supply metal may have the same composition as the work 1 or may have a different composition from the work 1. For example, when the work 1 is made of the titanium alloy, the supply metal may be the same titanium alloy as the work 1, may be a different titanium alloy from the work 1, or may be an alloy other than the titanium alloy.

The beads 21 to 24 constituting the first bank 2 are relatively small. For example, it is desirable that the beads 21 to 24 constituting the first bank 2 be smaller than beads 31 to 36 constituting a below-described first layer 3. These small beads 21 to 24 can be formed by, for example, reducing the output of the laser or reducing the supply amount of supply metal.

(2) First Layer Forming Step

Figure 4:
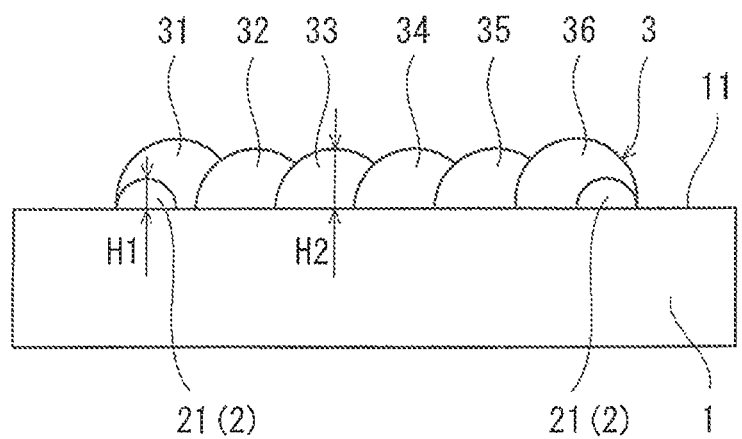
FIG. 4 is a sectional view of the work at which a first layer is formed in Embodiment 1.

In this step, as shown in FIG. 4, the first layer 3 is formed on the projection forming region 12 (see FIG. 1A) by the LIVID so as to cover the first bank 2. The first layer 3 is constituted by a plurality of beads lined up in a planar shape. It is desirable that when forming the first layer 3, at least two rows of beads be formed at an inside of the first bank 2. This is because the projection 8A having a relatively large width can be formed. In the present embodiment, the first layer 3 is formed by forming six beads 31 to 36 parallel to the long-side beads 21 and 22 of the first bank 2. To be specific, the beads 31 and 36 located at both ends are located right above the respective long-side beads 21 and 22 of the first bank 2. The other four beads 32 to 35 are located at the inside of the first bank 2. It should be noted that the beads 31 to 36 may be parallel to the short-side beads 23 and 24 of the first bank 2. The number of beads constituting the first layer 3 can be suitably changed.

In the present embodiment, the number of beads and the number of rows of the beads are equal to each other. However, these numbers do not necessarily have to be equal to each other. For example, a plurality of rows may be formed by one bead (for example, a zigzag bead in which the number of beads is one, but the number of rows is plural).

It is desirable that the bead constituting the first layer 3 and located right above the bead constituting the first bank 2 be formed so as to cover at least a top of the bead constituting the first bank 2. In the present embodiment, the beads 31 and 36 located at both ends of the first layer 3 are formed so as to respectively cover at least the tops of the long-side beads 21 and 22 of the first bank 2. In the present embodiment, from the viewpoint of quality, all the beads 31 to 36 are formed under substantially the same LMD conditions. Therefore, the tops of the beads 31 and 36 located at both ends are located higher than the tops of the bead 32 to 35 located at the inside of the first bank 2. To be specific, the surface of the first layer 3 bulges toward its peripheral edge.

It is desirable that the bead (in the present embodiment, each of the beads 31 and 36) constituting the first layer 3 and located right above the bead constituting the first bank 2 be formed such that the center of this bead is located at an inside of the center of the bead (in the present embodiment, the long-side bead (21 or 22)) constituting the first bank 2. With this, the surface of the first layer 3 can efficiently be made to bulge toward the peripheral edge. For example, the bead constituting the first layer 3 and located right above the bead constituting the first bank 2 may be formed such that an outside edge of this bead coincides with an outside edge of the bead constituting the first bank 2.

FIG. 4 shows a case where the beads 31 to 36 are formed in order from a left side to a right side. However, the order of the formation of the beads 31 to 36 is not limited to this. One example is that the beads 31 and 36 at both ends are first formed, the beads 32 and 35 are then formed, and the beads 33 and 34 are finally formed. As above, the order of the formation of the beads is not limited to the example shown in FIG. 4, and the same is true for a below-described first height raising layer 4, a below-described intermediate base layer 6, and a below-described second height raising layer 7.

It is desirable that a height H1 of the first bank 2 be equal to or more than 20% of a height H2 of each of the beads 32 to 35 located at the inside of the first bank 2. This is because when "H1<0.2×H2" is satisfied, the bulging of the surface of the first layer 3 toward the peripheral edge may become inadequate. It should be noted that the first bank 2 may have a height of "0.2×H2" by stacking two beads each having a height of "0.1×H2." It is more desirable that the height H1 of the first bank 2 be equal to or more than 40% of the height H2 of each of the beads 32 to 35. Further, it is desirable that the height H1 of the first bank 2 be lower than the height H2 of each of the beads 32 to 35 located at the inside of the first bank 2 (H1<H2).

(3) First Height Raising Layer Forming Step

Figure 5:
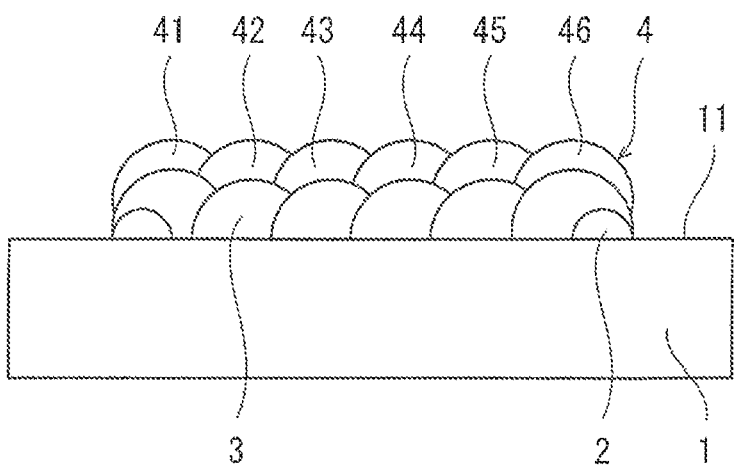
FIG. 5 is a sectional view of the work at which a first height raising layer is formed in Embodiment 1.

In this step, as shown in FIG. 5, at least one first height raising layer 4 is laminated on the first layer 3 by the LMD. Each first height raising layer 4 is constituted by a plurality of beads lined up in a planar shape. In the present embodiment, as with the first layer 3, each first height raising layer 4 is formed by forming six beads 41 to 46 parallel to the long-side beads 21 and 22 of the first bank 2. To be specific, the beads 41 to 46 are located right above the respective beads 31 to 36 constituting the first layer 3. The number of first height raising layers 4 is one in the present embodiment. However, the number of first height raising layers 4 may be plural.

The first height raising layer 4 is formed such that a peripheral edge of the first height raising layer 4 coincides with a peripheral edge of the first layer 3. To be specific, the first height raising layer 4 and the first layer 3 are substantially the same in size as each other and overlap each other.

(4) Second Bank Forming Step

Figure 6:
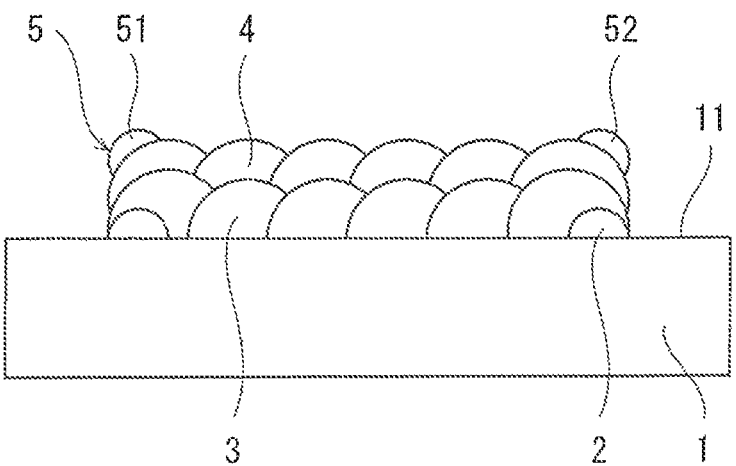
FIG. 6 is a sectional view of the work at which a second bank is formed in Embodiment 1.

In this step, as shown in FIG. 6, a second bank 5 is formed by the LMD along the peripheral edge of the first height raising layer 4. In other words, the second bank 5 is formed so as to trace a contour of the first height raising layer 4 from an inside of the contour. Since the projection forming region 12 has a quadrangular shape as described above, the second bank 5 has an annular shape as with the first bank 2.

The beads constituting the second bank 5 are relatively small. For example, it is desirable that the beads constituting the second bank 5 be smaller than the beads 41 to 46 of the first height raising layer 4 and beads 61 to 66 of the below-described intermediate base layer 6. Therefore, the long-side beads 51 and 52 of the second bank 5 respectively cover only outside portions of the beads 41 and 46 located at both ends of the first height raising layer 4, and inside portions of the beads 41 and 46 are exposed. These small beads can be formed by, for example, reducing the output of the laser or reducing the supply amount of supply metal.

The tops of at least the long-side beads 51 and 52 among the beads constituting the second bank 5 are located higher than the tops of the beads 41 to 46 constituting the first height raising layer 4.

(5) Intermediate Base Layer Forming Step

Figure 7:
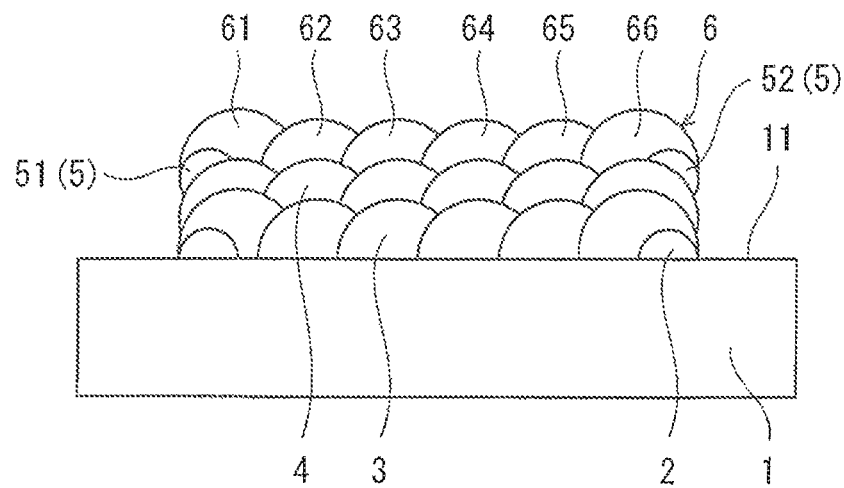
FIG. 7 is a sectional view of the work at which an intermediate base layer is formed in Embodiment 1.

In this step, as shown in FIG. 7, the intermediate base layer 6 is formed on the first height raising layer 4 by the LMD so as to cover the second bank 5. The intermediate base layer 6 is constituted by a plurality of beads lined up in a planar shape. More specifically, as with the first layer 3, the intermediate base layer 6 is formed by forming six beads 61 to 66 parallel to the long-side beads 21 and 22 of the first bank 2.

To be specific, the beads 61 and 66 located at both ends are located right above the respective long-side beads 51 and 52 of the second bank 5, and the other four beads 62 to 65 are located at the inside of the second bank 5. It is desirable that the beads constituting the intermediate base layer 6 and located right above the beads constituting the second bank 5 be formed so as to cover at least the tops of the beads constituting the second bank 5. In the present embodiment, the beads 61 and 66 located at both ends of the intermediate base layer 6 are formed so as to respectively cover at least the tops of the long-side beads 51 and 52 of the second bank 5. In the present embodiment, from the viewpoint of quality, all the beads 61 to 66 are formed under substantially the same LMD conditions. Therefore, the tops of the beads 61 and 66 located at both ends are located higher than the tops of the beads 62 to 65 located at the inside of the second bank 5. To be specific, the surface of the intermediate base layer 6 bulges toward its peripheral edge.

It is desirable that the bead (in the present embodiment, each of the beads 61 and 66) constituting the intermediate base layer 6 and located right above the bead constituting the second bank 5 (in the present embodiment, the long-side bead (51 or 52)) be formed such that the center of this bead is located at an inside of the center of the bead constituting the second bank 5. With this, the surface of the intermediate base layer 6 can efficiently be made to bulge toward the peripheral edge. For example, the bead constituting the intermediate base layer 6 and located right above the bead constituting the second bank 5 may be formed such that an outside edge of this bead coincides with an outside edge of the bead constituting the second bank 5.

(6) Second Height Raising Layer Forming Step

Figure 8:
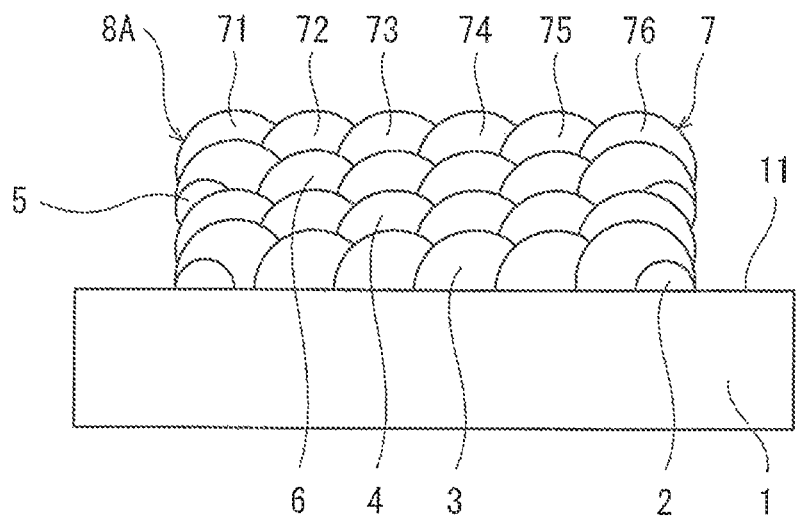
FIG. 8 is a sectional view of the work at which a second height raising layer is formed in Embodiment 1.

In this step, as shown in FIG. 8, at least one second height raising layer 7 is laminated on the intermediate base layer 6 by the LMD. Each second height raising layer 7 is constituted by a plurality of beads lined up in a planar shape. In the present embodiment, as with the first layer 3, each second height raising layer 7 is formed by forming six beads 71 to 76 parallel to the long-side beads 21 and 22 of the first bank 2. To be specific, the beads 71 to 76 are located right above the respective beads 61 to 66 constituting the intermediate base layer 6. The number of second height raising layers 7 is one in the present embodiment. However, the number of second height raising layers 7 may be plural.

The second height raising layer 7 is formed such that a peripheral edge of the second height raising layer 7 coincides with a peripheral edge of the intermediate base layer 6. To be specific, the second height raising layer 7 and the intermediate base layer 6 are substantially the same in size as each other and overlap each other.

Through the above steps, the projection 8A can be formed. Further, the higher projection 8A can be formed by repeatedly performing the second bank forming step, the intermediate base layer forming step, and the second height raising layer forming step.

Figure 9:
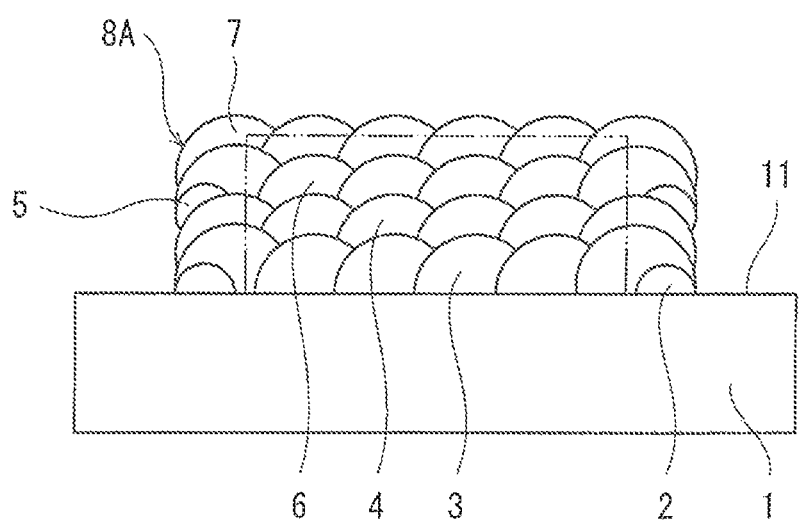
FIG. 9 is a sectional view of a projection in Embodiment 1.

The work 1 to which the projection 8A is added may be used as a product. However, as shown by a two-dot chain line in FIG. 9, after the projection 8A is formed, the projection 8A may be subjected to machine work such that the first bank 2 and the second bank 5 are eliminated. According to this configuration, a final convex portion obtained by subjecting the projection 8A to the machine work can secure high strength. A product including the projection 8A or the final convex portion may be incorporated in a machine as a part.

As described above, according to the projection forming method of the present embodiment, the first height raising layer 4 is laminated on the first layer 3 which is formed so as to cover the first bank 2. Therefore, flow-down of a fusion zone at the edge when forming the first height raising layer 4 is suppressed by the first bank 2 through the first layer 3. Therefore, the peripheral edge of the first height raising layer 4 can be made to coincide with the peripheral edge of the first layer 3. Further, the second bank 5 is formed along the peripheral edge of the first height raising layer 4, and the second height raising layer 7 is laminated on the intermediate base layer 6 which is formed so as to cover the second bank 5. Therefore, the flow-down of the fusion zone at the edge when forming the second height raising layer 7 is suppressed by the second bank 5 through the intermediate base layer 6. On this account, the peripheral edge of the second height raising layer 7 can be made to coincide with the peripheral edge of the intermediate base layer 6. Thus, the projection 8A rising with a substantially constant width can be formed.

According to the present embodiment, each of the surfaces of the respective layers (especially, the first height raising layer 4 and the second height raising layer 7) can be maintained substantially flat. Therefore, the focus of the laser can be maintained on the surface of each layer. On this account, the heat input to the surface of each layer is stabilized, and incomplete melting of supply metal and unmelted regions are not generated. Thus, defects, such as porosity, generated due to the incomplete melting of supply metal are not generated, and internal quality is stabilized.

Figure 10:
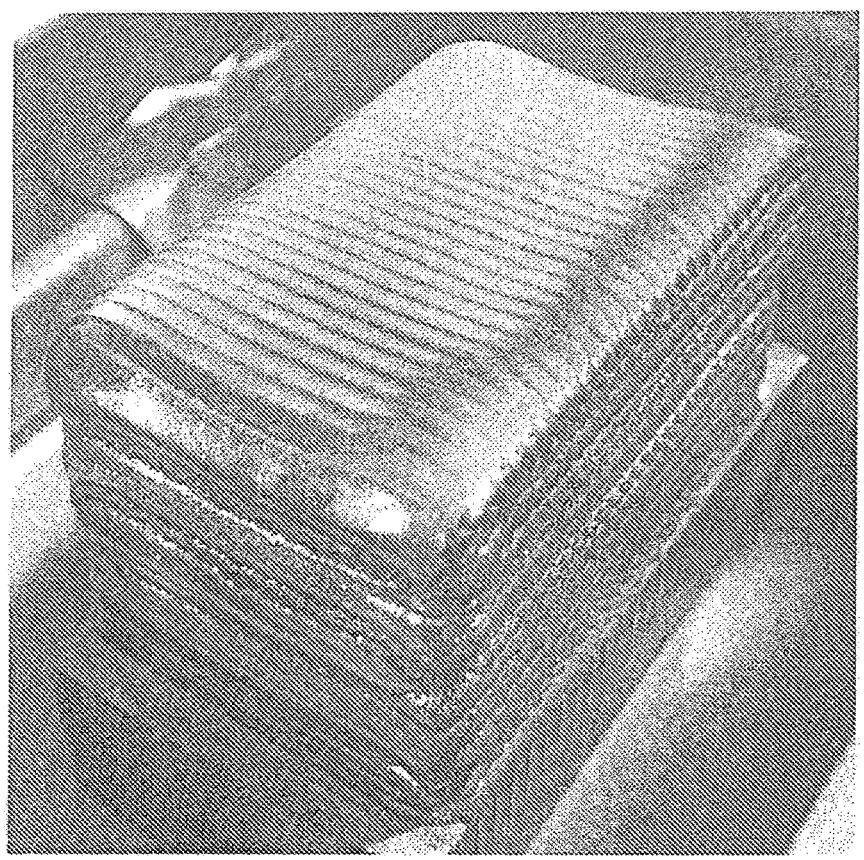
FIG. 10 is a photograph of the projection that was actually formed.

FIG. 10 shows the projection 8A formed by repeatedly performing the second bank forming step, the intermediate base layer forming step, and the second height raising layer forming step. In the example shown in FIG. 10, forty layers were formed in total, and as a result, the projection 8A having a height of about 50 mm and a rectangular solid shape was formed.

Modified Examples

In the above embodiment, each layer is formed by linear beads parallel to each other. However, the beads constituting each layer do not have to be linear. For example, when the projection 8A has a circular shape in a plan view, each layer may be constituted by a plurality of beads arranged concentrically or a continuous spiral bead. For example, when the first layer 3 is constituted by the continuous spiral bead, and the bead extends at the inside of the first bank 2 to form one or more circles, the number of beads is one, but the bead forms two or more rows at the inside of the first bank 2.

Embodiment 2

Figure 11:
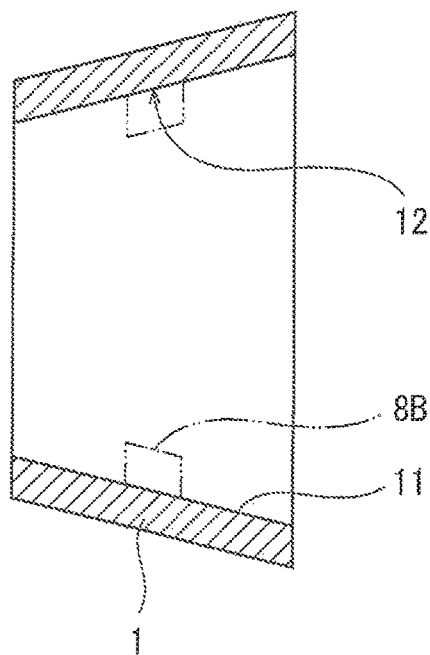
FIG. 11 is a sectional view of a work used in the projection forming method according to Embodiment 2 of the present invention.

As shown in FIG. 11, the projection forming method according to Embodiment 2 of the present invention is a method of forming a flange-shaped projection 8B on the surface 11 of the work 1. To be specific, in the present embodiment, the work 1 has a tubular shape, and the surface 11 of the work 1 is an inner peripheral surface of the work 1. It should be noted that the surface 11 of the work 1 may be an outer peripheral surface of the work 1.

Figure 12:
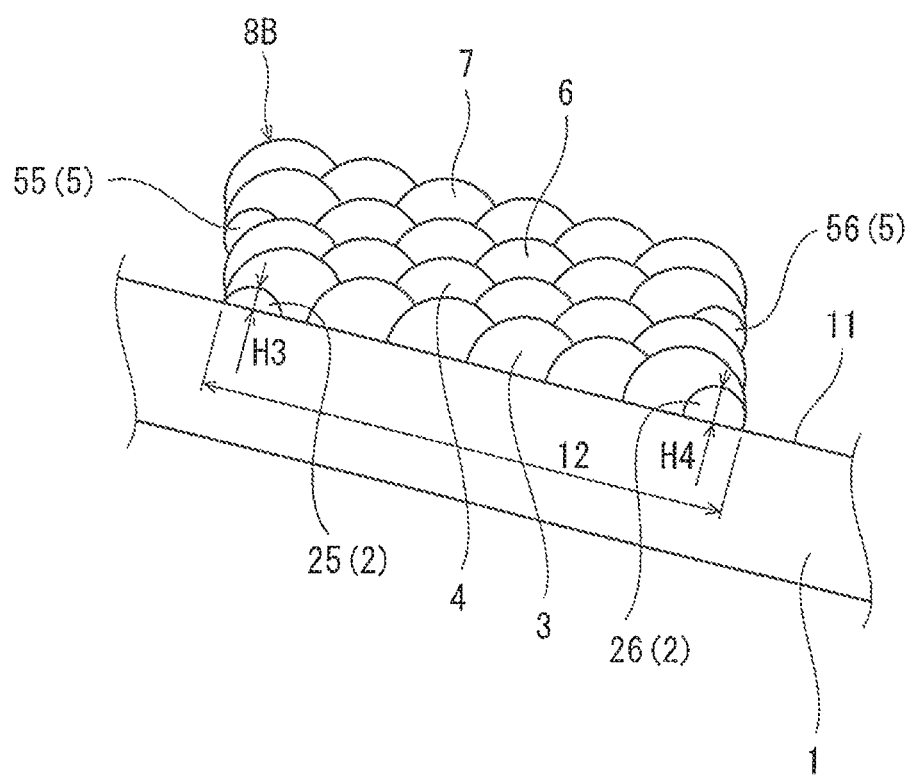
FIG. 12 is a sectional view of the projection in Embodiment 2.
Figure 13A:
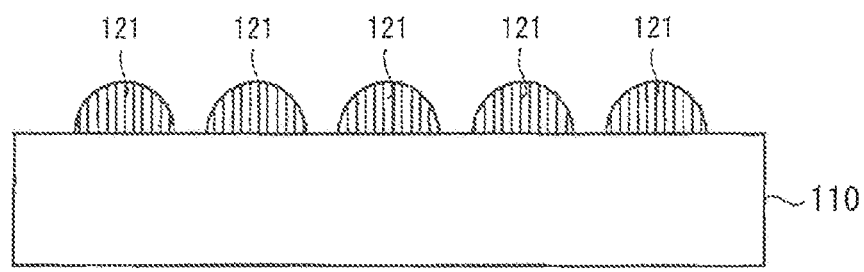
FIGS. 13A to 13D are diagrams for explaining a projection forming method using conventional LMD.
Figure 13B:
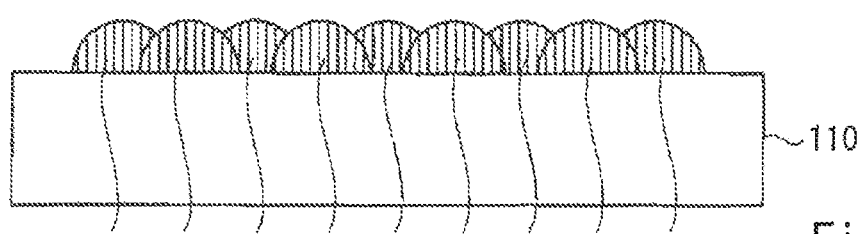
Figure 13C:
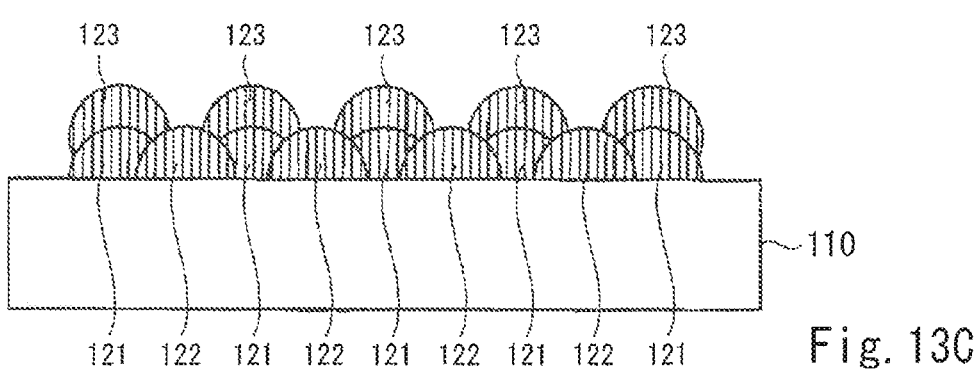
Figure 13D:
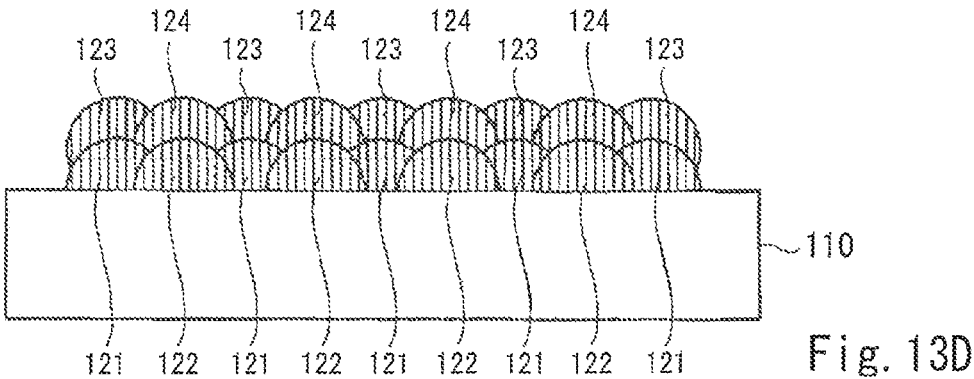
Figure 14:
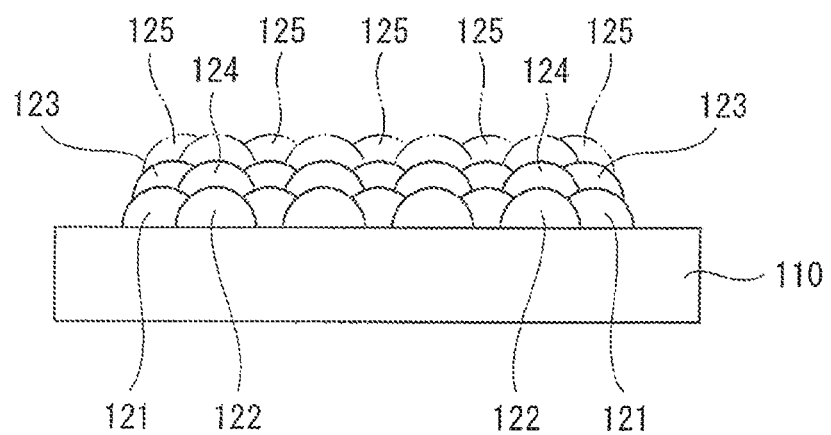
FIG. 14 is a sectional view of the projection actually formed by the projection forming method using the conventional LMD.

In the present embodiment, as with Embodiment 1, the first bank 2, the first layer 3, the first height raising layer 4, the second bank 5, the intermediate base layer 6, and the second height raising layer 7 are formed as shown in FIG. 12. It should be noted that since the projection 8B has a flange shape, the projection forming region 12 has a ring shape that is continuous in a circumferential direction. Therefore, the first bank 2 includes a pair of beads 25 and 26 opposed to each other in an axial direction of the work 1. Similarly, the second bank 5 includes a pair of beads 55 and 56 opposed to each other in the axial direction of the work 1.

Further, in the present embodiment, the surface 11 of the work 1 has a conical shape. The height of the large-diameter bead 26 of the first bank 2 is set to be higher than the height of the small-diameter bead 25 of the first bank 2. According to this configuration, the projection can be satisfactorily formed on a conical surface.

In the present embodiment, as with Embodiment 1, the projection 8B rising with a substantially constant width can be formed.

Other Embodiments

The present invention is not limited to the above embodiments, and various modifications may be made within the scope of the present invention.

For example, each of the bead constituting the first bank 2 and the bead constituting the second bank 5 do not necessarily have to be continuous and may be intermittent.

When forming the first bank 2 in the case of forming the projection 8A having a columnar shape as in Embodiment 1 on the surface of the work 1 which surface is inclined with respect to a horizontal plane, the bead located at a lower side is made larger than the bead located at a higher side as with Embodiment 2. With this, the projection can be satisfactorily formed on the inclined surface.

REFERENCE SIGNS LIST 1 work
11 surface 12 projection forming region
2 first bank
21 to 26 bead
3 first layer
31 to 36 bead
4 first height raising layer
5 second bank
55, 56 bead
6 intermediate base layer
7 second height raising layer
8A, 8B projection

The invention claimed is:

1. A method of forming a projection on an inner peripheral surface of a work having a tubular shape, the method comprising:
   forming a first bank by laser metal deposition such that the first bank surrounds a projection forming region on the inner peripheral surface of the work, the first bank including a pair of beads opposed to each other along an axial direction of the work, the projection forming region having a ring shape that is continuous in a circumferential direction of the work;
   forming a first layer on the projection forming region by the laser metal deposition such that the first layer covers the first bank;
   laminating at least one first height raising layer on the first layer by the laser metal deposition;
   forming a second bank by the laser metal deposition along a peripheral edge of the at least one first height raising layer;
   forming an intermediate base layer on the at least one first height raising layer by the laser metal deposition such that the intermediate base layer covers the second bank; and
   laminating at least one second height raising layer on the intermediate base layer by the laser metal deposition.

2. The method according to claim 1, wherein:
   the inner peripheral surface of the work has a conical shape; and
   a height of a large-diameter bead that is one of the pair of beads of the first bank is higher than a height of a small-diameter bead that is the other of the pair of beads of the first bank.

3. The method according to claim 1, wherein when forming the first layer, at least two rows of beads are formed at an inside of the first bank.

4. The method according to claim 3, wherein a height of the first bank is equal to or more than 20% of a height of the at least two rows of beads.

5. The method according to claim 1, wherein a bead constituting the first layer and located right above a bead of the pair of beads constituting the first bank is formed so as to cover at least a top of the bead of the pair of beads constituting the first bank.

6. The method according to claim 1, wherein the work is made of a titanium alloy.

7. The method according to claim 1, wherein after the projection is formed, the projection is subjected to machine work such that the first bank and the second bank are eliminated.

8. A machine incorporating, as a part thereof, a product obtained by the method according to claim 1.

9. The method according to claim 1, wherein:
   the first layer includes a plurality of beads including two axial end beads that cover the first bank, and at least two inner beads formed inside of the two axial end beads along the axial direction,
   the at least two inner beads of the first layer are formed so as to directly contact the inner peripheral surface of the work on an inside of the pair of beads of the first bank, and
   the two axial end beads of the first layer are formed to have a height that is higher than a height of the at least two inner beads of the first layer, the height of the two axial end beads and the height of the at least two inner beads extending in a direction that is parallel to a radial direction of the work and is orthogonal to the axial direction of the work.

* * * * *